United States Patent [19]

Keresztessy née Badi et al.

[11] Patent Number: 4,608,090
[45] Date of Patent: Aug. 26, 1986

[54] PLASTIC DEFORMABLE COMPOSITION AND PROCESS FOR THE PREPARATION THEREOF

[75] Inventors: Mária Keresztessy née Badi; Eleonora Paka née Kas, both of Nyirbogdany; Lájos Gyongyossy, Budapest; Béla Farkas, Budapest; Sándor Paku, Budapest, all of Hungary

[73] Assignee: Szegvari Haziipari Szovetkezet, Szegvar, Hungary

[21] Appl. No.: 712,857

[22] Filed: Mar. 13, 1985

[30] Foreign Application Priority Data

Mar. 13, 1984 [HU] Hungary ............................ 1003/84

[51] Int. Cl.$^4$ ............................................. C08L 91/06
[52] U.S. Cl. ................................................... 106/272
[58] Field of Search ............................... 106/270–272; 208/21

[56] References Cited

U.S. PATENT DOCUMENTS 3,600,202  8/1971  MacLeod ........................... 208/21
4,002,706  1/1977  Pretorius ........................... 208/21

Primary Examiner—Theodore Morris
Attorney, Agent, or Firm—Young & Thompson

[57] ABSTRACT

The invention relates to a plastic deformable composition containing an adhesive and mineral grist. The adhesive is a mixture of 20–25% by weight of middle oil raffinate, 20–25% by weight of heavy oil raffinate, 40–52% by weight of microcrystalline paraffin, 1–4% by weight of macrocrystalline paraffin, 0.1–1.0% by weight of stearic acid and 0.01–2.0% by weight of coloring agent. The invention further relates to a process for preparing the above composition.

7 Claims, No Drawings

PLASTIC DEFORMABLE COMPOSITION AND PROCESS FOR THE PREPARATION THEREOF

The invention relates to a process for preparing plastic deformable compositions with a low carcingoen content.

The known plastic materials contain mineral grists combined with vaseline, beewax, paraffine, paraffine oil, oily acid, or blown vegetable oils used as adhesive, or the mixture thereof.

There are some requirements to be met by plastic materials:

(1) Their carcinogen content should be under 5 $\mu g./kg.$ according to norm MSZ-20160/1-82.

(2) For touching by hand they should be plastic and their plasticity should be maintained either at body temperature or at $-25°$ C., additionally at $36°-37°$ C. (body temperature) they should not flow.

(3) The adhesive and fat should not migrate from the plastic materials.

(4) They should not be flammable.

(5) The colouring agent used should not be toxic.

(6) They should not colour the human skin and should not be adhesive.

The plastic materials known do not or only partially fulfil the above requirements. Their carcinogen content is in many cases above 5 $\mu g./kg.$, at extreme temperature values they loose their plasticity, and burst. At body temperature they flow and adhere to the hand surface. The adhesive partially migrates from the material and it is also flammable.

The purpose of the invention is to eliminate the above deficiencies of the known plastic materials.

We have found a fully suitable composition fulfilling the above requirements for plastic materials, where the mixture of different oil raffinates and paraffines are used as adhesives for the known mineral grists.

Furthermore we have found that the carcinogen content of the composition results from one of the paraffines used, namely the microcrystalline paraffine and the carcinogen content can be eliminated by activated clay treating.

The invention relates to a plastic deformable composition containing as adhesive for the mineral grists 20–25% by weight of middle oil raffinate, 20–25% by weight of heavy oil raffinate, 40–52% by weight of microcrystalline paraffine, 1–4% by weight of macrocrystalline paraffine, 0.1 to 1.0% by weight of stearic acid and 0.01–2.0% by weight of colouring agent.

The invention relates furthermore to a process for preparing plastic deformable compositions by mixing together 20–25% by weight of middle oil raffinate, 20–24% by weight of heavy oil raffinate, 40–52% by weight of carcinogen-free microcrystalline paraffine, 1–4% by weight of macrocrystalline paraffine, 0.1 to 1.0% by weight of stearic acid and 0.01 to 2.0% by weight of colouring agent, the mixture obtained being mixed with mineral grists.

As mineral grists the composition according to the invention contains the grist of mineral matters generally used for plastic materials. As mineral matters preferably dolomite, baryte, talc and calcium carbonate can be mentioned.

An important requirement for the compositions according to the invention is to be plastic to the touch. This plasticity is defined by the solidification point of the oil raffinates used. The composition according to the invention contains a paraffine-free and hydrogenized middle oil raffinate having a solidification point preferably between $-15°$ C. and $-18°$ C., more preferably $-16°$ C. as well as a paraffine free and hydrogenized heavy oil raffinate having a solidification point between $-14°$ C. and $-16°$ C., more preferably $-15°$ C.

As microcrystalline paraffine the microcrystalline form prepared by the generally known process is used, preferably having an approximate molar weight of 400–700, containing preferably 0.2 to 10 weight% of oil.

The approximate molar weight of the macrocrystalline paraffin used is preferably 200–300 and its drop point preferably between $50°54°$ C.

As colouring agents preferably non-toxic colouring agents, as aniline colours soluble in fat, oxide colours and other similar colours are used in the compositions according to the invention.

According to the process of the invention a homogeneous mixture is prepared from the oil raffinates, paraffines, stearic acid and the colouring agents and all the necessary additives are added to the mineral grist in one step in the form of the mixture obtained.

According to a preferred method of the invention the carcinogen content of the microcrystalline paraffine is reduced to a value under 5 $\mu g./kg.$ by treating once or more times by activated clay of 3–6% by weight.

The compositions and the process thereof are set forth in detail in the following, non-limiting examples.

EXAMPLE 1

212 kg. of hydrogenized middle oil raffinate and 250 kg. of hydrogenized heavy oil raffinate are added into a double walled vessel of 1300 l. equipped with a mechanical mixer. The equipment is heated to a temperature around 100° C., then 512 kg. (molar weight 600) of microcrystalline paraffine with 6% oil content, once pretreated with activated clay of 6%, 20 kg. of macrocrystalline paraffin having a drop point of 52° C., 5 kg. of stearic acid (acid number: 180 mgKOH/g.) and 1.0 kg. of aniline colouring soluble in fat are added under stirring.

The mixture is stirred at 100° C. until the complete solution of the solid materials is effected and until the sample will be homogeneous and lump-free.

250 kg. of the adhesive composition thus obtained is pressed into an equipment equipped with a homogenisator of 1000 l capacity, then 750 kg. of calcium carbonate are added under stirring. The mixture is stirred until a completely homogeneous mass is obtained.

The material is put into tin vessels of 40°–50° C. suitable for plastic deformation.

EXAMPLE 2

A plastic composition is prepared by mixing together the following materials according to example 1:

220 kg. of hydrogenized middle oil raffinate
228 kg. of hydrogenized heavy oil raffinate
520 kg. of microcrystalline paraffine pretreated with 3% activated clay, having a molar weight of 400 and containing 100% of oil
10 kg. of macrocrystalline paraffine having a drop point: 54° C.
2 kg. of stearic acid with an acid number 195 mgKOH/g.
20 kg. of chemically pure oxide read colouring 270 kg. of the thus prepared composition is separated and homogenized with 500 kg. of calcium carbonate and 230 kg. of slate powder.

A plastic and removable sealing mass is obtained.

EXAMPLE 3

A plastic composition is prepared by mixing together the following materials according to Example 1:

250 kg. of hydrogenized middle oil raffinate
225 kg. of hydrogenized heavy oil raffinate
465 kg. of microcrystalline paraffine having a molar weight of 700 pretreated once with activated clay of 4% and containing 1% oil
40 kg. of macrocrystalline paraffine having a drop point: 50° C.
10 kg. of stearic acid with an acid number of 190 mgKOH/g.
10 kg. of chemically pure tiridian 300 kg. of the prepared composition is separated and homogenized with 500 kg. of calcium carbonate, 100 kg. of slate powder and 100 kg. of baryte.

The plastic material thus obtained is suitable for sealing purposes.

We claim:

1. Plastic deformable composition comprising: mineral grist selected from the group consisting of dolomite, baryte, talc and calcium carbonate; and an adhesive, said adhesive comprising a mixture of 20–25% by weight of a first oil raffinate having a solidification point from −15° C. to −18° C., 20–25% by weight of a second oil raffinate having a solidification point from −14° C. to −16° C., 40–52% by weight of microcrystalline paraffin having molecular weight from 400–700, 1–4% of weight of macrocrystalline paraffin having molecular weight from 200–300, 0.1–1.0% by weight of stearine and 0.01–2.0% by weight of coloring agent.

2. Composition according to claim 1, wherein said first and second oil raffinates are paraffin-free and hydrogenized.

3. Composition according to claim 1, wherein said first oil raffinate has a solidification point of −16° C., and said second oil raffinate has a solidification point of −15° C.

4. Composition according to claim 1, wherein said microcrystalline paraffin having molecular weight from 400–700 comprises 0.2–10% by weight oil.

5. Composition according to claim 1, wherein said macrocrystalline paraffin having molecular weight from 200–300 has a drop point from 50°–54° C.

6. A process for preparing plastic deformable compositions comprising the steps of: combining 20–15% by weight of a first oil raffinate having a solidification point from −15° C. to −18° C., 20–25% by weight of a second oil raffinate having a solidification point from −14° C. to −16° C., 40–52% by weight of carcinogen-free microcrystalline paraffin having a molecular weight from 400–700, 1–4% by weight of macrocrystalline paraffin having a molecular weight from 200–300, 0.1–1.0% by weight of stearine and 0.01–2.0% by weight of coloring agent into a homogeneous mixture; and mixing this composition with a mineral grist selected from the group consisting of dolomite, baryte, talc and calcium carbonate.

7. A process according to claim 6 and a preliminary step of providing said carcinogen-free microcrystalline paraffin having molecular weight from 400–700 by treating carcinogen-containing microcrystalline paraffin having molecular weight from 400–700 with 3–6% by weight activated clay.

* * * * *